(12) United States Patent
Vissenberg et al.

(10) Patent No.: US 7,688,509 B2
(45) Date of Patent: Mar. 30, 2010

(54) AUTOSTEREOSCOPIC DISPLAY

(75) Inventors: Michel Cornelis Josephus Marie Vissenberg, Eindhoven (NL); Willem Lubertus Ijzerman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 148 days.

(21) Appl. No.: 10/545,648

(22) PCT Filed: Feb. 11, 2004

(86) PCT No.: PCT/IB2004/050099

§ 371 (c)(1),
(2), (4) Date: Aug. 16, 2005

(87) PCT Pub. No.: WO2004/075526

PCT Pub. Date: Sep. 2, 2004

(65) Prior Publication Data

US 2006/0158729 A1    Jul. 20, 2006

(30) Foreign Application Priority Data

Feb. 21, 2003  (EP) .................................. 03100423

(51) Int. Cl.
*G02B 27/22* (2006.01)
*G09G 5/00* (2006.01)
(52) U.S. Cl. ..................... 359/463; 359/464; 359/462; 345/6
(58) Field of Classification Search ........... 359/462, 359/463, 832, 666, 354, 358, 464; 349/196; 345/6
See application file for complete search history.

(56) References Cited

U.S. PATENT DOCUMENTS

| | | | |
|---|---|---|---|
| 4,660,938 A | 4/1987 | Kazan | |
| 5,663,831 A * | 9/1997 | Mashitani et al. | 359/463 |
| 5,717,453 A | 2/1998 | Wohlstedter | |
| 5,493,427 A | 2/1999 | Katagiri et al. | |
| 5,969,850 A * | 10/1999 | Harrold et al. | 359/320 |
| 5,986,811 A | 11/1999 | Wohlstadter | |
| 6,014,259 A | 1/2000 | Wohlstadter | |
| 6,069,650 A | 5/2000 | Battersby | |
| 6,169,594 B1 * | 1/2001 | Aye et al. | 349/196 |
| 6,275,254 B1 | 8/2001 | Beeteson et al. | |
| 6,369,954 B1 * | 4/2002 | Berge et al. | 359/666 |
| 6,714,174 B2 * | 3/2004 | Suyama et al. | 345/32 |
| 2002/0047837 A1 | 11/2002 | Munekazu et al. | |

(Continued)

FOREIGN PATENT DOCUMENTS

DE    19519417 A1    11/1996

(Continued)

OTHER PUBLICATIONS

Tohoru Takeda, et al: Fluorescent Scanning X-Ray Tomography with Synchrotron Radiation.

(Continued)

*Primary Examiner*—Audrey Y Chang

(57) ABSTRACT

An autostereoscopic display device includes a device configured to provide collimated light and a dynamic beam deflector which is configured to scan a beam. The exit angle of the light emitted by pixels of the display array transmitted through a splitting screen is controlled and scanned by the dynamic beam deflector.

13 Claims, 6 Drawing Sheets

U.S. PATENT DOCUMENTS

2003/0025995 A1    2/2003    Berkvens et al.
2003/0085850 A1*   5/2003    Feenstra et al. ............... 345/32
2005/0253779 A1*  11/2005    Feenstra et al. ................ 345/6

FOREIGN PATENT DOCUMENTS

EP    0785457 A2    7/1997
EP    0833183 B1    1/1998
EP    0899969 A     3/1999

OTHER PUBLICATIONS

Klaus H. Knapp: Brillenfreier 3D-Bildschirm MIT Blickgesteuerter Maus EIM Nachfuhrsystem Halt Den Schirm Immer in der Optomalen Sterobetrachtungszone, vol. 48, No. 24, Nov. 1999, pp. 40-44.

* cited by examiner

AUTOSTEREOSCOPIC DISPLAY

The invention relates to an autostereoscopic display device comprising a display array comprising a number of addressable pixels, a means for addressing the pixels in the display array and a splitting screen in front of the display array.

An autostereoscopic display device of the type described in the opening paragraph is known form United States patent U.S. Pat. No. 6,275,254.

Basically, a three dimensional impression can be created by using stereo pairs (two different images directed at the two eyes of the viewer), holographic techniques, or multiple planes in the displays. With the multiplanar techniques, a volumetric image is constructed, in which the 2D pixels are replaced by so-called voxels in a 3d volume. A disadvantage of most multiplanar displays is that the voxels produce light, but do not block it. This leads to transparent objects, giving quite literally a ghostly and unpleasant appearance to the displayed images.

Stereoscopic displays do not suffer from this problem. There are several ways to produce stereo images. The images may be time multiplexed on a 2D display, but this requires that the viewers wear glasses with e.g. LCD shutters. When the stereo images are displayed at the same time, the images can be directed to the appropriate eye by using a head mounted display, or by using polarized glasses (the images are then produced with orthogonally polarized light). The glasses worn by the observer effectively route the views to each eye. Shutters or polarizer's in the glasses are synchronised to the frame rate to control the routing. To prevent flicker, the frame rate must be doubled or the resolution halved with respect to the two dimensional equivalent image. A disadvantage with such as system is that the two images produce only a limited "look around" capability. Furthermore, glasses have to be worn to produce any effect. This is unpleasant for those observers who are not familiar with wearing glasses and a potential problem for those already wearing glasses, since the extra pair of glasses do not always fit.

Instead of near the viewers eyes, the two stereo images can also be split at the display screen by means of splitting screen such as a lenticular screen or a parallax barrier. E.g. in FIGS. 3 and 4 of United States patent U.S. Pat. No. 6,275,254 the principle is shown.

Although these displays are autostereoscopic in the sense that no special glasses are required to view the 3D image, they usually work only for one viewer at a fixed position in space. The viewing zone is very narrow. Outside the viewing zone, the observer sees multiple images or a stereo inversion, leading to a very unpleasant view. In practice this means that for many application, for instance in living rooms, the viewing zone is so small that the viewer has to be seated at one particular spot to be able to see a 3D image. Solution which offer multi-view images do so at the cost of resolution.

The device known from United States patent U.S. Pat. No. 6,275,254 offers a solution to the narrow viewing zone problem by using a planar cathode ray tube type display having columns of pixels, and with a special magnet for sweeping electron beams to different parts of the corresponding pixels, and having a lenticular lens screen having a plurality of cylindrical lenses each corresponding to a different column of pixels. In this manner it is possible to create a multiview autostereoscopic display.

Although it is possible to obtain a multiview autostereoscopic display with a relatively high resolution in the manner described in U.S. Pat. No. 6,275,254, it requires a highly specialised planar cathode ray tube. Planar cathode ray tubes, even apart from the use of a special deflection mechanism as necessary for the display device described in United States patent U.S. Pat. No. 6,275,254, have, although such devices have frequently been described in literature, never been successful.

It is therefore an object of the invention to provide an alternative to the known device.

To this end the device in accordance with the invention is characterized in that the display device comprises a means for providing collimated light emitted by the pixels of the display array towards the splitting screen, and in that the splitting screen is a dynamic splitting screen, and in that the device comprises means for controlling the dynamic splitting screen for controlling the exit angle of the light emitted by pixels of the display array transmitted through the splitting screen.

Collimated light means, within the concept of the invention, light which is confined to within a relatively narrow angle, typically less than 10 degrees, preferably less than 5 degrees and most preferably within approximately 2 degrees. Within the framework of the invention "collimation" means collimation in at least one direction, the direction of scanning, not necessarily in two direction, i.e. not necessarily also in a direction perpendicular to the scanning direction. In practice this will often mean collimation in the horizontal direction (left-right), whereas collimation in a vertical direction (up-down) will or can be much less or not apparent.

By using collimated light entering the splitting screen, the light path of the light coming into the splitting screen is substantially fixed, in particular the direction and/or position vis-à-vis the splitting screen is fixed. The splitting screen is dynamic, i.e. it has optical elements whose optical properties are controllable in such a manner that the exit angles of the light paths are controllable and scannable over a range of exit angles by controllably changing the exit angle of the light emitted by pixels of the display array transmitted through the splitting screen. In this manner a multi-view, i.e. wide viewing zone for more than one person, stereoscopic display device is obtainable. By varying the exit angle the light of a particular pixel is in operation directed to different viewing zones. This is a fundamental difference with the known multi-view autostereoscopic devices since in these devices to each viewing zone of the multiview viewing different pixels or parts of pixels are assigned.

Collimating the light is a relatively simple operation, well known to a person skilled in the art, which is applicable to many, if not all known matrix display devices, i.e. not requiring a specialized, as yet unsuccessful, display device. One can use a display array which in itself already emits collimated light (e.g. display arrays based on one or more lasers), or one can use a matrix such as an LCD or OLED display array, which normally provides a matrix of pixels emitting non-collimated or diffuse light, and position in the light path before the splitting screen a collimator (e.g. a Fresnel lens or a plate with holes) to collimate the light. Such a collimator can be positioned between a continuous light source (e.g. the backlight of an LCD matrix display) and a switchable spatial light modulator (e.g. the LCD array of an LCD display device) or after the switchable light modulator. Using a PLED or OLED display array (of which devices the pixels emit light in a wide range of angles) the collimator may be positioned between the splitting screen and the PLED or OLED array. The collimator can be e.g. an array of lenses, e.g. Fresnel lenses, or a filter transmitting only light within a certain narrow angle range. An alternative is e.g. a multilayer interference filter positioned between the light source and the splitting screen transmitting light only in a narrow forward angle range, while reflecting light outside this range. In any of these embodiments collimated light enters the splitting screen.

The scannable splitting screen scans the image, and sequentially displays the image in a range of exit angles. By timing the displayed image on the display array with the scan using the means for addressing the pixels of the display screen, a multiview autostereoscopic displaying of images is achievable.

In a first class of embodiments the splitting screen is a lenticular lens screen having a plurality of cylindrical lenses arranged such in respect to the pixels of the display array that the collimated light of a pixel enters a lens off-axis, and the focal point of the lens is controllable. Since the collimated light enters the lens off-axis the exiting light exits the lens under a deflection angle. This deflection angle is dependent on the focal point of the lens. By changing the focal point of the lens the angle of deflection (and thereby the exit angle) is controllable. This will sweep the light produced by the pixel over an exit angle range.

In embodiments of the invention the splitting screen comprises wettable liquid lenses, having a liquid lens array and electrodes and means to provide voltage differences between the electrodes whereby the shape of a wettable liquid lens is a function of the voltage difference over electrodes. The change in shape of the wettable lens affect the exit angle.

The shape of a lens may be changed by changing the voltage difference over electrodes. A substantial sweep (of ±30° to ±50°) is possible. It is remarked that U.S. Pat. No. 5,717,453 describes the use of variable wettable lenses (or as named in U.S. Pat. No. 5,717,453 variable focus liquid lenses) for an autostereoscopic device. However, in this known device to each point or pixel a variable lens is associated and the rays form each pixel are controlled to reach the eye at a predetermined angle corresponding to the 3D depth desired for that pixel. The viewer is still positioned at the same spot (i.e. the exit angle is not changed) but the focus is changed to give a depth perception. In this invention the off-axis entry of the light leads to a change of exit angle, i.e. sweep of the light over viewing zones.

Alternatively the variable lenses are solid lenses of a first material, embedded or surrounded by a second material, whereby the index of refraction of the first and/or second material is dependent on voltages applied on or over the first or second material. By changing the index of refraction the focal point of the lens can be changed. This is a less preferred embodiment in respect of the previously described embodiment since a relatively small change in focal point is possible, reducing the sweep.

In a second, preferred, class of embodiments of the device in accordance with the invention, the splitting screen comprises a plurality of variable prisms and, associated with the variable prisms, electrodes for applying voltage differences for varying the exit angle of collimated light being incident on the variable prisms.

"Variable prisms" within the concept of the invention means prisms of which the angle of deflection of a light ray entering the prism at the side facing the pixel array is dynamically variable. This embodiment is preferred since a somewhat larger sweep of angles (compared to wettable lenses) is possible, and because the restriction of entering off-axis is removed, which allows for more freedom in design and accuracy. Furthermore the restriction on the collimation of the light are less for a variable prism than for an variable lens (i.e. a somewhat larger variation in entry angles may be allowed).

In embodiments of the invention the variable prisms are formed by variable wetting prisms.

In variable wetting prisms the application of a voltage difference leads to a change in the angle of the prism, changing the exit angle.

In embodiments of the invention the variable prisms are formed by solid prisms of a first material, embedded or surrounded by a second material, whereby the index of refraction of the first and/or second material is dependent on voltages applied on or over the first or second material. By changing the index of refraction the exit angle can be changed.

These and other aspects of the invention are apparent from and will be elucidated with reference to the embodiments described hereinafter.

Figure 3A:
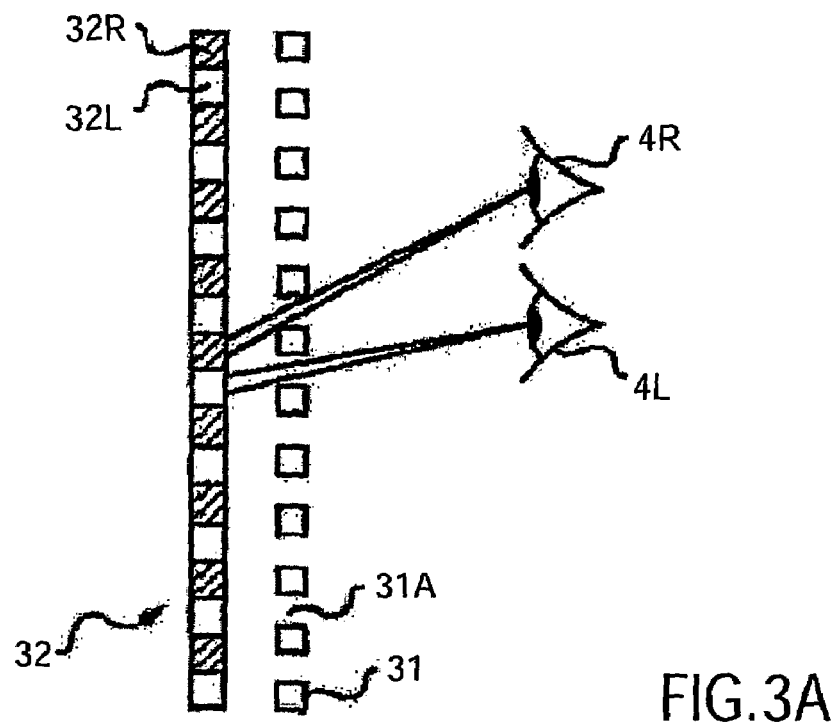
Figure 3B:
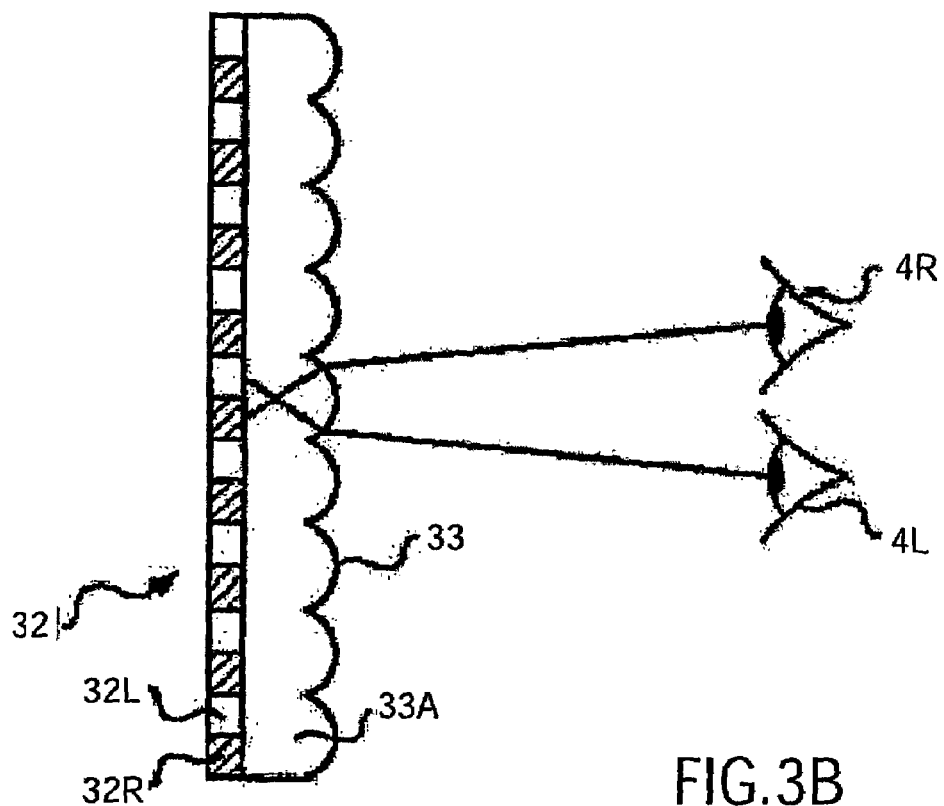

FIGS. 3A and 3B illustrate the same principles as shown in U.S. Pat. No. 6,275,254.

Figure 4:
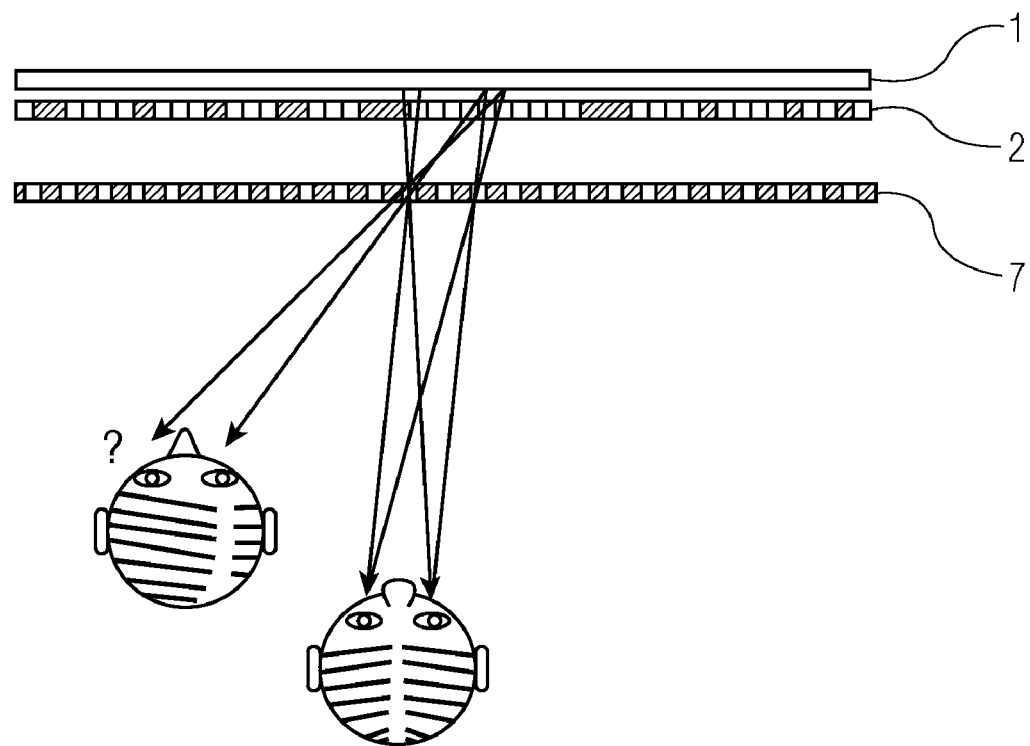

FIG. 4 illustrates the problem encountered with a basic parallax barrier display.

Figure 5:
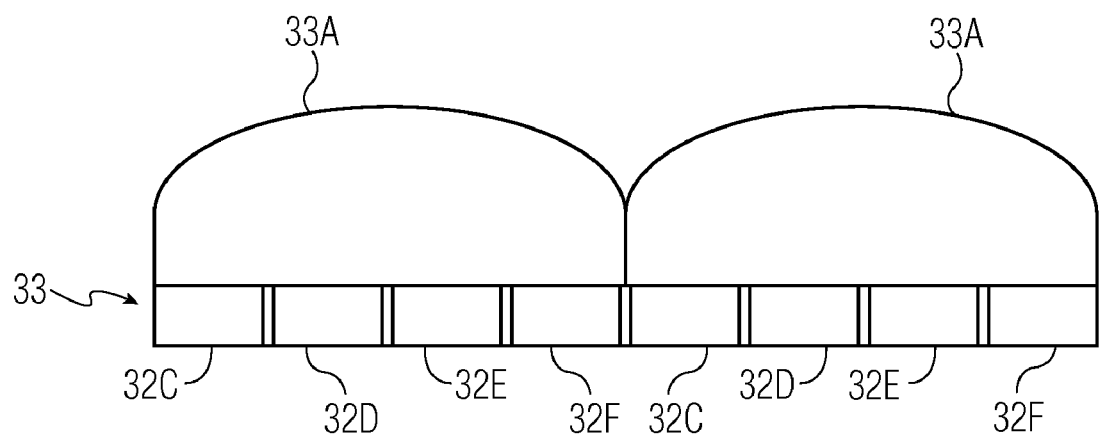
Figure 6:
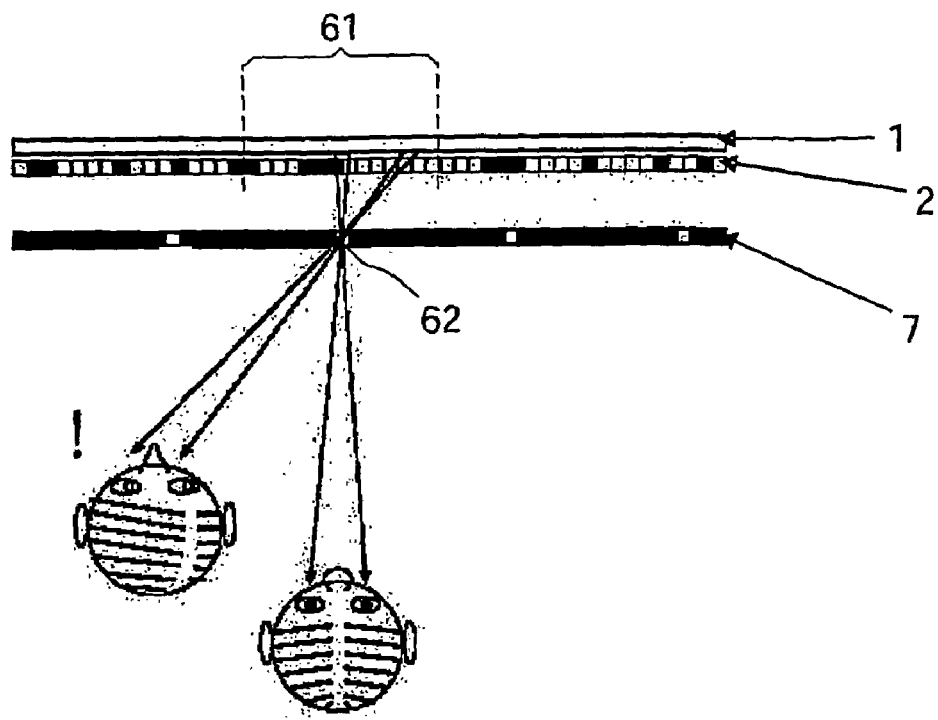

FIGS. 5 and 6 illustrate known multi-view devices.

Figures 7A, 7B:
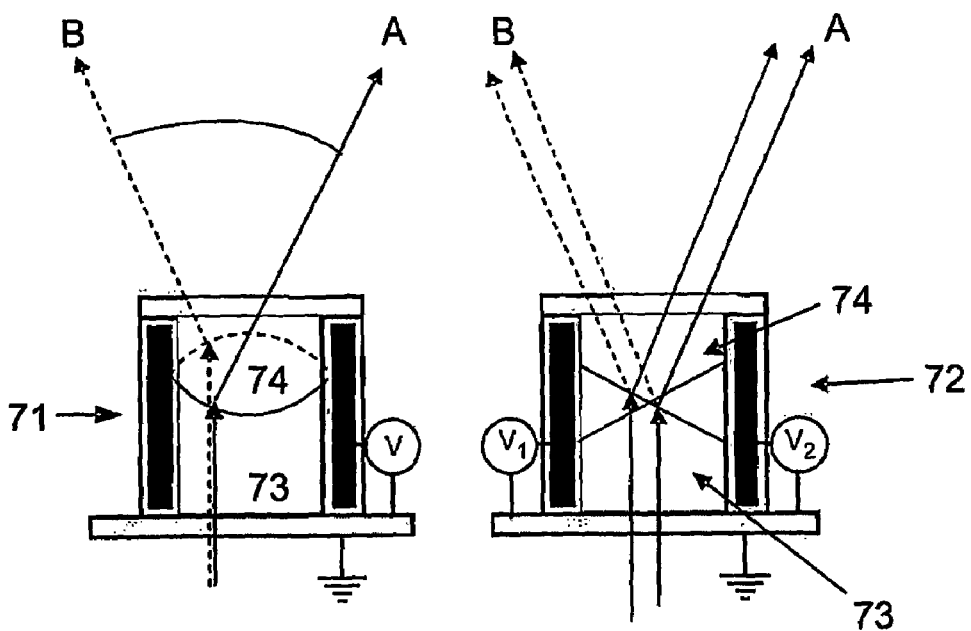

FIGS. 7A and 7B illustrate dynamic lenses and prism.

Figure 8:
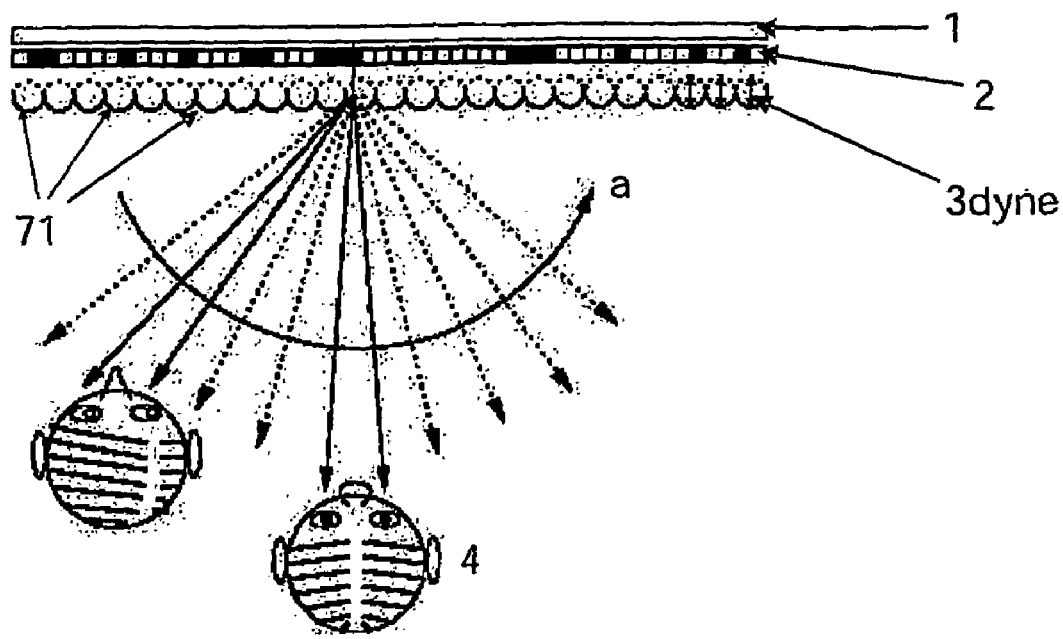

FIG. 8 illustrates a device in accordance with the invention having dynamic lenses.

Figure 9:
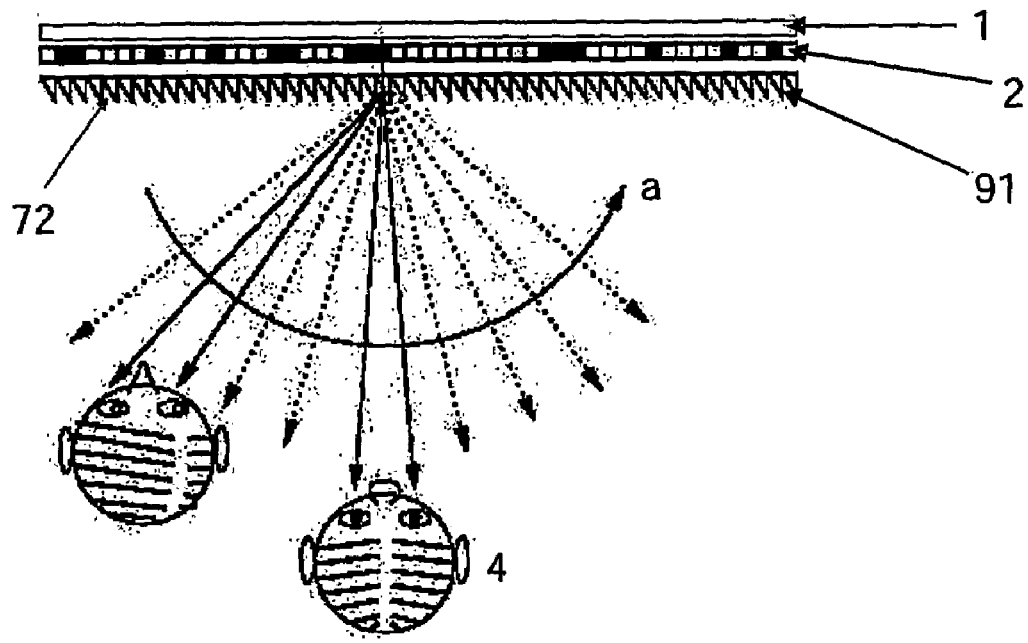

FIG. 9 illustrates a device in accordance with the invention having dynamic prism.

Figure 10:
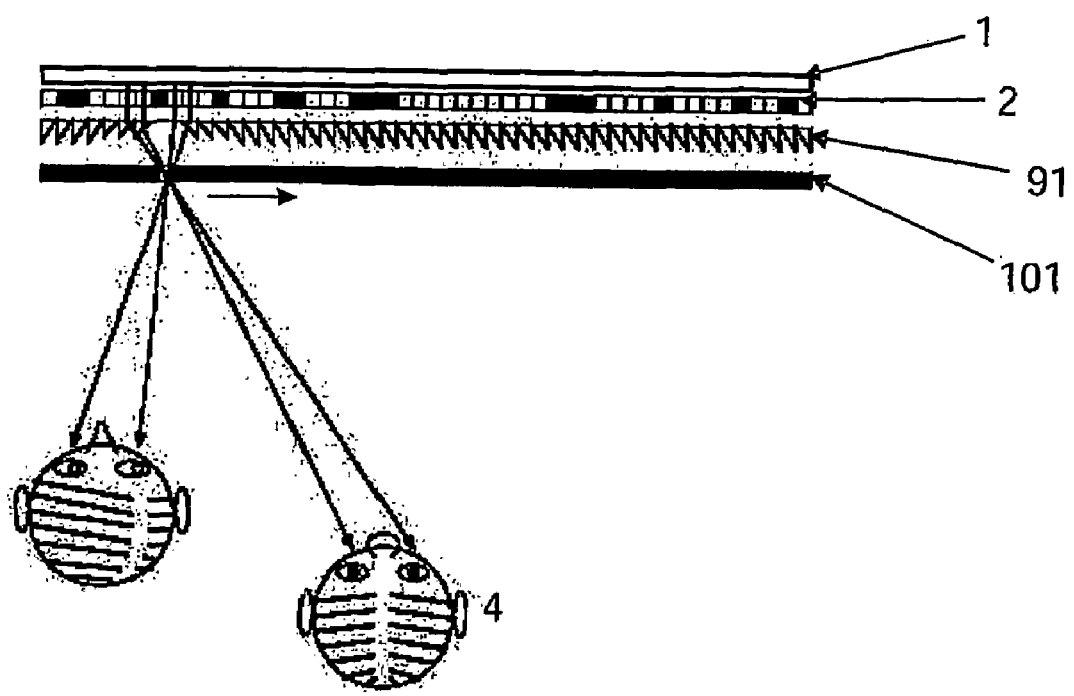

FIG. 10 illustrates a further device in accordance with the invention having dynamic prisms and a dynamic barrier layer.

The figures are not drawn to scale. Generally, identical components are denoted by the same reference numerals in the figures.

Figure 1:
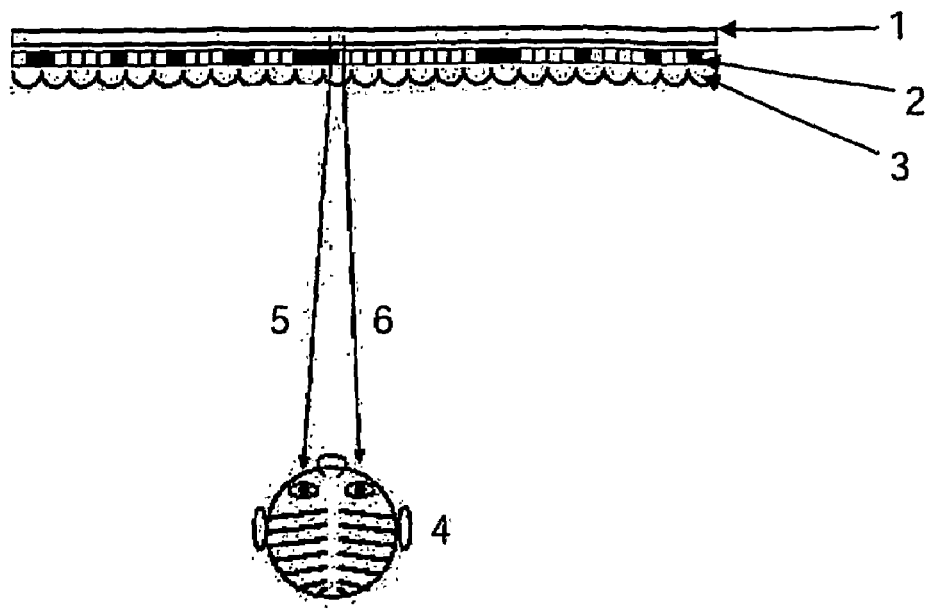
FIG. 1 illustrates the basic principle of a lenticular screen splitting two stereo images.

FIG. 1 illustrates the basic principle of a lenticular screen splitting 3 two stereo images 5 and 6. The vertical lines of two stereo images are (spatially) alternatingly displayed on, e.g., a spatial light modulator 2 (e.g. a LCD) with a backlight 1. Together the back light and the spatial light modulator form a pixel array. The lens structure of the lenticular screen 3 directs the stereo image to the appropriate eye of the viewer.

Figure 2:
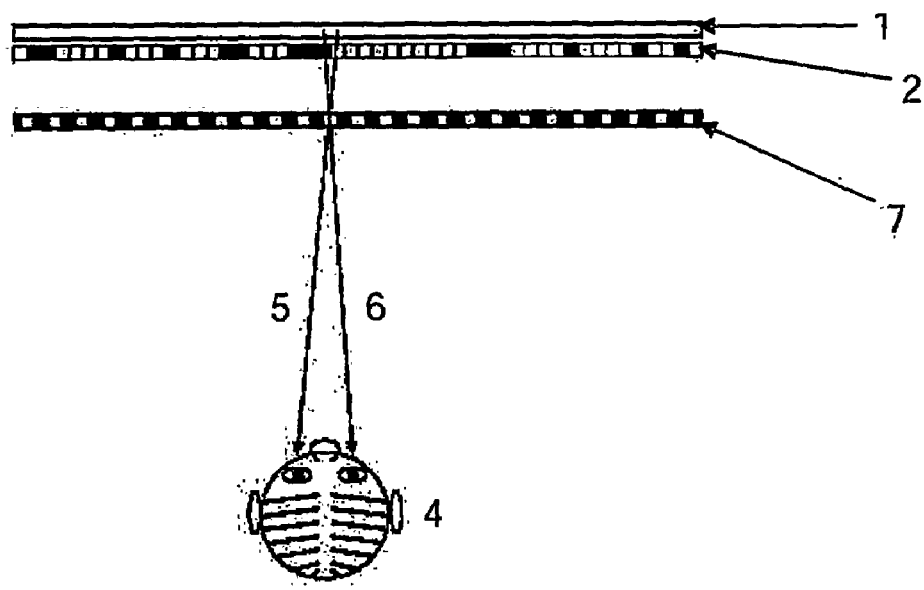
FIG. 2 illustrates the basic principle of a parallax barrier splitting two stereo images.

FIG. 2 illustrates the basic principle of a parallax barrier splitting two stereo images. The vertical lines of two stereo images are alternatingly displayed on, e.g.; a spatial light modulator (e.g. a LCD) with a back light. The grating structure of the parallax barrier 7 ensures that each eye of the viewer 4 sees the appropriate stereo image (5, 6).

FIG. 3A and 3B illustrate the same principles as shown in U.S. Pat. No. 6,275,254.

In a conventional barrier auto-stereoscopic display system, a barrier 31 is disposed in front of a display array 32. The left and right images of a stereo pair of images are sliced into vertical strips. The strips 32L of the left image and the strips 32R of the right image are alternately disposed on array 32. Slots 31A are formed in barrier 31. Slots 31A are positioned so that the left eye 4L of an observer can see only strips 32L of the left image and the right eye 4R can see only strips 32R of the right image of the pair. The observer reconstructs the full image in three dimensions.

Referring now to FIG. 3B, barrier 31 is replaced by a lenticular lens screen 33 having an array of vertical cylindrical lenses 33A each corresponding to a different pair of left and right image strips 32L and 32R. In operation each lens directs the left eye 4L of an observer onto a left image strip 32L and the right eye 4R of the observer onto a right image strip 32R.

FIG. 4 illustrates the problem of the basic stereoscopic device. A viewer which is not seated within the right viewing zone is confused. The viewing zone is very narrow. Outside the viewing zone, the observer sees multiple images or a stereo inversion, leading to a very unpleasant view. In practice this means that for many application, for instance in living rooms, the viewing zone is so small that the viewer has to be seated at one particular spot only to be able to see anything. For living room use this is far from optimal since only one viewer can see the 3D image and then only when seated on one spot.

It is possible, as shown in FIG. 6 of U.S. Pat. No. 6,275,254 to use for each lens of the lenticular screen more than one vertical column of display elements. In this manner a multiview display is possible. Schematically this is indicated in FIG. 5. To each lens 33A several pixels (32C, 32D, 33E, 32F) are associated.

For the parallax barrier, a multiviewer display can be made by making it possible to view many (columns of) pixels of the spatial light modulator through the same slit of the barrier, as sketched in FIG. 6. Although this will work, it is to be noted that the number of slits in respect of the number of pixels is greatly decreased in respect of FIG. 4, or vice versa the number of pixels per slit is greatly increased. The pixels within region 61 are associated with the slit 62 so the number of pixels per slit is large.

However, in both solutions the number of directional views is increased at the cost of resolution since a large number of columns of pixels is associated with each lens or each barrier slit. These lenses and slits should be, in order to get a resolution comparable to the resolution for the viewer in a device as shown in FIG. 4 relatively small and thus this means for instance that, for sub-millimetre resolution of the display, the pixels must be smaller than 10 microns (assuming 100 directional views). Besides the deterioration of resolution which is present for lenticular lenses and parallax barriers alike, the light transmission through a parallax barrier is also greatly reduced, since only one of about 100 vertical lines of the barrier is transparent. This blocking of (more than) 99% of the light results in an extremely inefficient display.

To increase the resolution the device disclosed in U.S. Pat. No. 6,275,254 uses a specialized planar CRT device, in which, using special magnets electron beans are swept over pixels. Since the spot size in a CRT can be relatively small while yet giving a relatively large light output the resolution can be kept at a reasonable value with a reasonable light output. Thus the fundamental problem (i.e. the requirement of very small pixel size and problems with light output) is not solved in U.S. Pat. No. 6,275,254 only a means for making very small, very bright spots is chosen. However, as said, this requires a very specialized, as yet unsuccessful (even without the special magnets which are necessary for the device disclosed in U.S. Pat. No. 6,275,254) type of planar CRT.

A partial solution could be to use a dynamic parallax barrier, i.e. a barrier in which the openings in the slits move. Such an autostereoscopic device is disclosed in the European patent application nr. EP 0 833 183 A1 e.g. in FIG. 36 of said patent application. In a dynamic barrier layer (which can be constituted be an LCD shutter array) the transmitting line or lines are not fixed as in FIG. 6 but are scanned along the parallax barrier (e.g. from left to right or vice versa). For each position of the transmitting line of dynamic parallax barrier a different picture is displayed on the spatial light modulator behind the dynamic parallax barrier. This allows an increase of resolution since in contrast to the device shown in FIG. 6 pixels are not associated with a single slit. However the drawback is that the frame rate of the spatial light modulator is increased with the same factor as the resolution gain (for example a factor of 100). This high frame rate limits the possible candidates for producing the image, and poses a problem for others. Besides the necessity of having to use a high frame rate, also an enormous light output is required, since the dynamic parallax barrier of EP 0 833 183 is as inefficient as a static parallax barrier.

Thus the problem remains that a good 3D display should be autostereoscopic in the sense that no glasses are required yet have a good light output.

Furthermore it preferably has a "look-around" capability to avoid problems with focussing of the eye and headaches. Preferably this capability should be intrinsic to the display, without additional means for tracking the head of the viewer. For TV applications, the display must also have a multiviewer capability. Finally, the 3D display should also be 2D compatible. The above autostereoscopic displays with multiviewer capability can in principle be made by means of a lenticular screen or a parallax barrier, but at the cost of a greatly reduced resolution.

To this end the device in accordance with the invention is characterized in that the display device comprises a means for providing collimated light emitted by the pixels of the display array towards the splitting screen, and in that the splitting screen is a dynamic splitting screen, and in that the device comprises means for controlling the dynamic splitting screen for controlling the exit angle of the light emitted by pixels of the display array transmitted through the splitting screen.

The present invention provides an alternative path of solving the problems. The splitting screen is dynamic and acts as a variable deflector to deflect the light and thereby vary the exit angle of the light emitted by the pixels. Thus the light of a pixel is swept over several viewing zones, and resolution can be maintained.

FIGS. 7A and 7B illustrates variable optical elements, such as lenses and prisms. The basic idea is that a variable lens, mirror, or prism can be formed by the interface of two substances such as immiscible liquids with different refractive indices. The shape of this interface is manipulated by electrowetting, i.e. by varying the contact angle of the interface to the boundary of the cell by means of an electrostatic potential. The lay-out of an electrowetting lens and an electrowetting deflector is given in FIGS. 7A and 7B wherein in FIG. 7A a variable electrowetting lens 71 is shown. The focal strength depends on the curvature of the meniscus between oil and water (73, 74), which is varied through the potential difference between the water and the (insulated) electrodes at the side. An off-axis entering collimated light beam (i.e. with a relatively small variation in angle) is deflected, depending on the curvature, two situations are shown, one (full lines) in which the light beam is deflected to the right (viewing zone A) and one in which the light beam is deflected to the left (viewing zone B). Thus a collimate light beam from one pixel can be deflected over a angle range (indicated by the curve between the arrows A and B. In FIG. 7B a variable electrowetting prism is schematically shown. The deflection angle can be varied by varying the orientation of the meniscus through the potentials V1 and V2 at the two sides of the cell. two situations are shown, one (full lines) in which the light beam is deflected to the right (viewing zone A) and one in which the light beam is deflected to the left (viewing zone B). Thus a collimate light beam from one pixel can be deflected over a angle range (indicated by the curve between the arrows A and B.

A high-resolution multiviewer autostereoscopic display can thus be obtained with a dynamic lenticular screen, where the (static) cylinder lenses of the lenticular screen are replaced by variable, preferably electrowetting cylinder lenses with a variable strength. The deflection angle may be varied by varying the strength of the lens. This is schematically and by means of example shown in FIG. 8. The exemplary device comprise a collimated backlight 1, a spatial light modulator 2, a dynamic lenticular screen 3dyn, comprising dynamic lenses 71. Changing the voltages changes, as schematically illustrated in FIG. 7A the exit angle α of the light beam, and thus the light is scanned over a wide range of angles. A drawback of this method is the increase in frame rate of the light modulator: for each dynamically addressed viewing angle, a different 2D image must be displayed on the modulator. An optimum may be found by exchanging spatial resolution for time resolution: e.g. 10 modulator pixels per variable lens, each addressing 10 separate viewing angles per frame time, to obtain 100 viewing angles per display pixel.

Another option is to, as already schematically indicated in FIG. 7B, to use variable, preferably electrowetting, deflectors (flat interfaces) instead of variable lenses (curved menisci). A deflection angle of up to 100° is possible by refraction, and up to 125° deflection is possible by reflection. A device having dynamic deflectors is sketched in FIG. 9. In this case, the light beams (formed by collimated backlight 1 and spatial light modulator 2) are scanned over exit angles α by varying the orientation of the prism 72 formed in dynamic prism array 91 by changing the orientation of the liquid interface. The same considerations hold with regard to modulator frame rate and resolution: several pixels may be grouped into one, each scanning a segment of viewing directions. In this way, resolution can be exchanged for a reduction of frame rate and deflection angle.

The dynamic prism solution is preferred over the dynamic lens solution, since, the exact position of the beam is more restricted in dynamic lenses in which the beam has to be confined to an off-axis part of the lens than in the dynamic prism where the beam can use all or at least most of the prism.

The use of a parallax barrier enables a good spatial resolution in combination with a good angular resolution, however at the cost of a high modulator frame rate and a low efficiency as was explained above. The low efficiency can be greatly improved by using a collimated back light in combination with a dynamic beam deflector 91 in combination with a dynamic parallax barrier 101, as sketched in FIG. 10. In this display, all the light from the modulator is aimed at a line that is in the transmitting state. Hence much less light is lost at the barrier. For example, when the quality of the backlight and deflector system is such that it produces light beams with a divergence of 5°, and the parallax barrier selects a viewing direction within 1°, about 20% of the light is transmitted, instead of less than 1%, increasing the light output by a factor of 20. The barrier is dynamic, i.e. only that part of the barrier is open which is useful (this can be done for instance with LCD's). Of course, also in this embodiment several compromises are possible between spatial resolution (width of barrier line), angular resolution (number of modulator lines per barrier line), modulator frame rate, and light efficiency. The devices as shown in FIG. 10 use a dynamic parallax barrier, which in itself is known. However, using a dynamic beam deflector 91 in combination with a dynamic parallax barrier offers the possibility of a great increase in light output (of the order of several times to an order of magnitude to even more) and that opens new possibilities which hitherbefore could not be reached. The dynamic beam deflector 91 and the dynamic parallax barrier 101 may be separated by a glass plate and preferably attached to said glass plate at opposite side the glass plate. Using a glass plate has the advantage of providing a sturdy construction and it allows a reduction of the distance between the dynamic beam deflector and the dynamic parallax barrier, reducing the depth of the device.

In short the invention can be described (with reference to e.g. FIG. 8) as follows:

An autostereoscopic display device comprises a means for providing collimated light (1, 2) and a dynamic beam deflector (3dyn). By means of the dynamic beam deflector the beam is scanned. The exit angle of the light emitted by pixels of the display array transmitted through the splitting screen is controlled by the dynamic beam deflector (3dyn).

It will be clear that within the concept of the invention many variations are possible. For instance the lenses or prism may be variably focussed or oriented through mechanical means. For example, flexible polymeric or elastomeric lenses may be compressed or relaxed so as to vary their shape and thereby the exit angle of the off-axis entering light. Alternatively liquid lenses or prisms in flexible casing may be mechanically compressed or relaxed akin to the human eye.

The invention claimed is:

1. An autostereoscopic display device including a display array comprising:
   a number of addressable pixels,
   means for addressing the pixels in the display array,
   a splitting screen in front of the display array,
   means for providing collimated light emitted by the pixels of the display array towards the splitting screen, wherein the splitting screen is a dynamic splitting screen having variable lenses, and
   means for controlling the dynamic splitting screen for controlling an exit angle of light emitted through the splitting screen by changing voltage levels applied to two opposite sides of at least one of the variable lenses to change an orientation of flat interfaces between two immiscible liquids of the variable lenses so that different images are directed to two eyes of a viewer, wherein the two opposite sides are adjacent to an entry axis of an entrance light entering the dynamic splitting screen, and wherein in a first voltage level changes the orientation to deflect the light emitted through the splitting screen to a first side, and a second voltage level changes the orientation to deflect the light emitted through the splitting screen to a second side, wherein the first side is different from the second side, and wherein the light deflect to the first side is directed to a right eye of the viewer, and the light deflect to the second side is directed to a left eye of the viewer.

2. The autostereoscopic display device as claimed in claim 1, wherein the splitting screen is a lenticular lens screen having a plurality of cylindrical lenses arranged such in respect to the pixels of the display array that the collimated light of a pixel enters a first lens of the a plurality of cylindrical lenses off-axis, and the focal point of the first lens is controllable.

3. The autostereoscopic display device as claimed in claim 1, wherein the splitting screen comprises liquid lenses having a liquid lens array and electrodes and means to provide voltage differences between the electrodes whereby a shape of a liquid lens is a function of the voltage differences over electrodes.

4. The autostereoscopic display device as claimed in claim 1, wherein the splitting screen comprises a plurality of variable prisms and, associated with the variable prisms, electrodes for applying voltage differences for varying an exit angle of collimated light being incident on the variable prisms.

5. The autostereoscopic display device as claimed in claim 1, wherein the display device further comprises a dynamic parallax barrier in front of the dynamic splitting screen.

6. The autostereoscopic display device of claim 1, wherein the two opposite sides are substantially parallel to the entry axis.

7. A display device comprising:

a plurality of pixels; and a plurality of variable lenses in front of the plurality of pixels for receiving light emitted by the plurality of pixels and output an exit light toward a viewer, at least one lens of the plurality of variable lenses having a flat interface between two immiscible liquids; wherein orientation of the flat interface is changeable by changing voltage levels applied to two opposite sides of the at least one lens so that different images are directed to two eyes of the viewer, wherein the two opposite sides are adjacent to an entry axis of an entrance light entering the at least one lens, and wherein in a first voltage level changes the orientation to deflect light emitted through the plurality of pixels to a first side, and a second voltage level changes the orientation to deflect the light to a second side, wherein the first side is different from the second side, and wherein the light deflect to the first side is directed to a right eye of the viewer, and the light deflect to the second side is directed to a left eye of the viewer.

8. The display device of claim 7, wherein changing the orientation changes an exit angle of the exit light emitted through the at least one lens.

9. The display device of claim 7, further comprising a source of collimated light to provide the collimated light to the plurality of variable lenses.

10. The display device of claim 7, further comprising a source to provide light off-center to the at least one lens.

11. The display device of claim 7, wherein the orientation is changed by changing a voltage applied to the at least one lens.

12. The display device of claim 7, wherein the plurality of variable lenses form an array.

13. The display device of claim 7, wherein the two opposite sides are substantially parallel to the entry axis.

* * * * *